(12) United States Patent
Okamoto

(10) Patent No.: US 8,086,094 B2
(45) Date of Patent: Dec. 27, 2011

(54) INFORMATION RECORDING APPARATUS AND INFORMATION RECORDING CONTROL APPARATUS

(75) Inventor: Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1191 days.

(21) Appl. No.: 11/736,248

(22) Filed: Apr. 17, 2007

(65) Prior Publication Data

US 2007/0242929 A1 Oct. 18, 2007

(30) Foreign Application Priority Data

Apr. 17, 2006 (JP) ................... 2006-113466

(51) Int. Cl.
*H04N 5/92* (2006.01)
(52) U.S. Cl. ..................... 386/338; 386/340
(58) Field of Classification Search ............. 386/200, 386/215, 327, 338, 340
See application file for complete search history.

(56) References Cited

U.S. PATENT DOCUMENTS

| 5,570,134 A | 10/1996 | Hong |
| 6,266,477 B1 * | 7/2001 | Ichinoi ................ 386/314 |
| 2003/0208771 A1 | 11/2003 | Hensgen et al. |
| 2005/0285980 A1 * | 12/2005 | Katayama ............ 348/738 |
| 2006/0078274 A1 | 4/2006 | Miyazawa |
| 2007/0098372 A1 * | 5/2007 | Hsu et al. .............. 386/124 |

FOREIGN PATENT DOCUMENTS

| EP | 0 917 355 A1 | 5/1999 |
| EP | 1 843 604 A2 | 10/2007 |
| JP | 2002-77791 A | 3/2002 |
| JP | 2003-504984 A | 2/2003 |
| JP | 2003-333532 A | 11/2003 |
| JP | 2004-289594 A | 10/2004 |
| JP | 2006-94432 A | 4/2006 |

OTHER PUBLICATIONS

Japanese Office Action dated Nov. 24, 2010 with English translation (four (4) pages).
European Search Report dated Aug. 23, 2011 (seven (7) pages).

* cited by examiner

*Primary Examiner* — Huy T Nguyen
(74) *Attorney, Agent, or Firm* — Crowell & Moring LLP

(57) ABSTRACT

An information recording control apparatus including: a selection section; a video acquiring section to acquire digital video data in a digital broadcast signal; an audio acquiring section to acquire digital audio data of a specific language selected on the selection section from the digital audio data of a plurality of languages in the digital broadcast signal; a video converting section to convert the acquired digital video data into an analog video signal; an audio converting section to convert the acquired the digital audio data of specific language into an analog audio signal of the specific language; and an output section to output, to a recording device, the converted analog video signal, and the converted analog audio signal of the specific language.

3 Claims, 6 Drawing Sheets

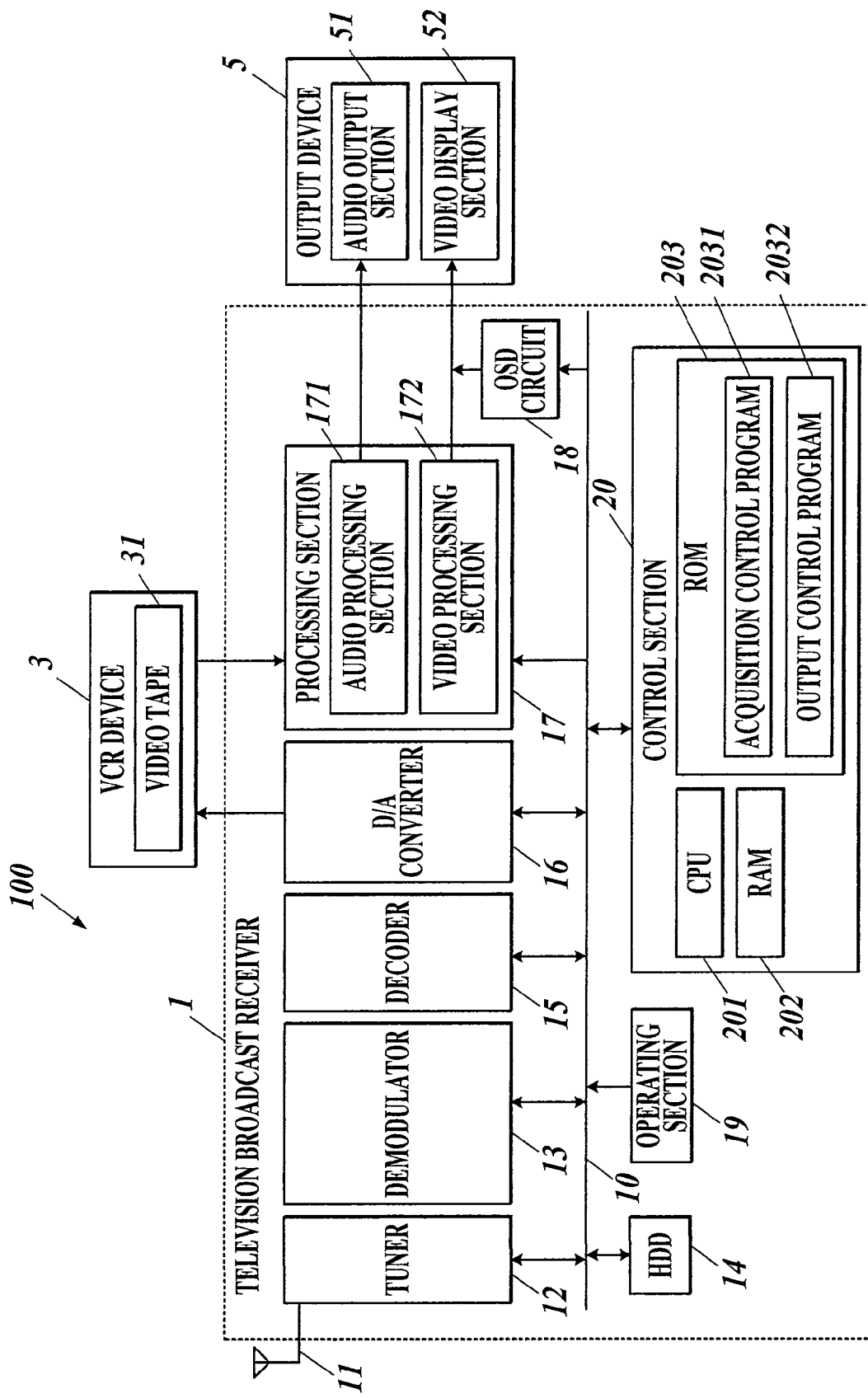

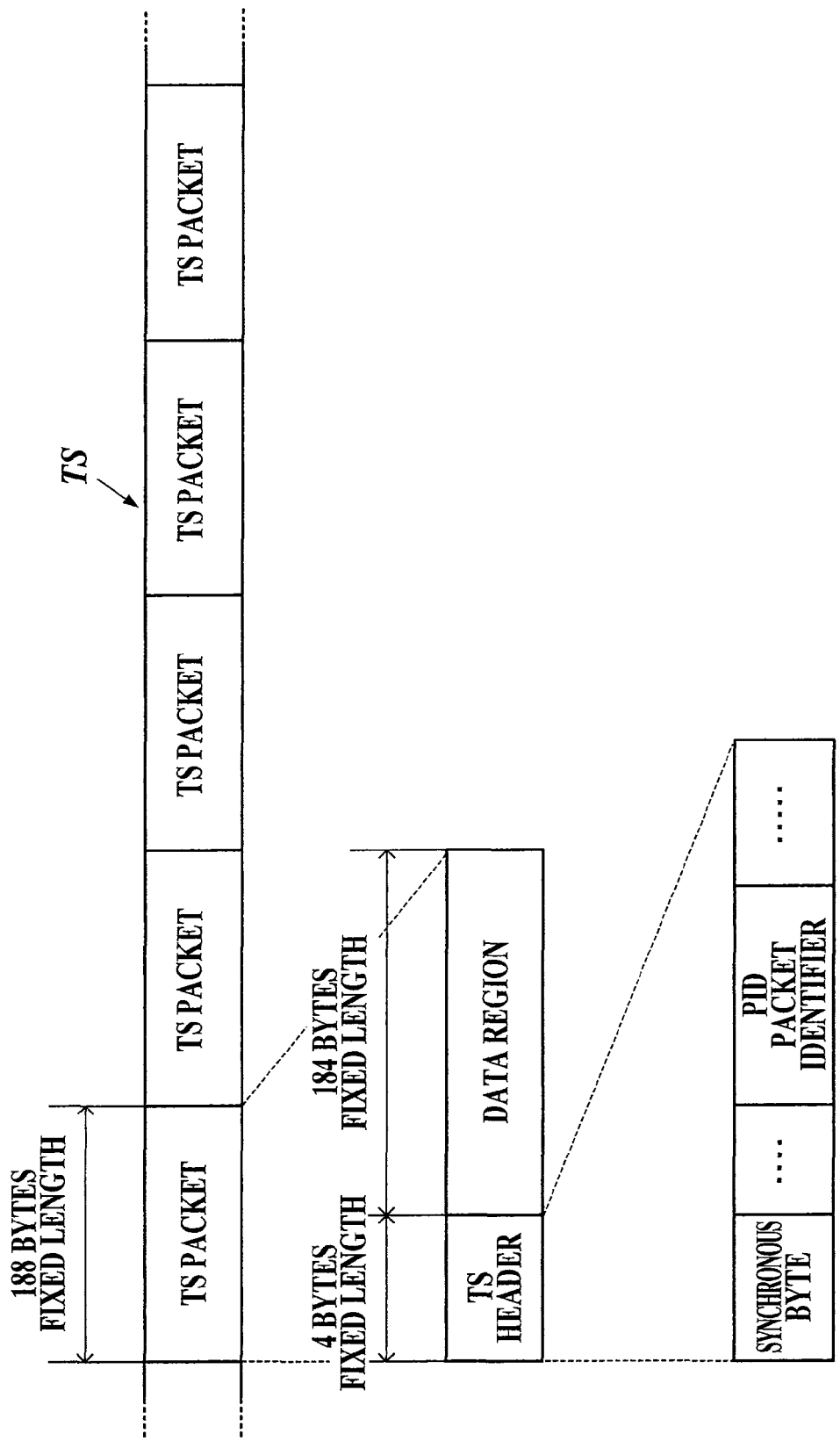

| TS PACKET PAT PID 0 | TS PACKET PMT OF PROGRAM 1 PID 11 | TS PACKET PMT OF PROGRAM 2 PID 12 | TS PACKET VIDEO DATA OF PROGRAM 1 PID 13 | TS PACKET VIDEO DATA OF PROGRAM 2 PID 18 | TS PACKET AUDIO DATA OF PROGRAM 1 LANGUAGE: ENGLISH PID 14 | TS PACKET AUDIO DATA OF PROGRAM 2 LANGUAGE: ENGLISH PID 19 | TS PACKET AUDIO DATA OF PROGRAM 1 LANGUAGE: SPANISH PID 15 | TS PACKET AUDIO DATA OF PROGRAM 2 LANGUAGE: SPANISH PID 20 |

| TS PACKET VIDEO DATA OF PROGRAM 2 PID 18 | TS PACKET AUDIO DATA OF PROGRAM 1 LANGUAGE: ENGLISH PID 14 | TS PACKET AUDIO DATA OF PROGRAM 1 LANGUAGE: SPANISH PID 15 | TS PACKET AUDIO DATA OF PROGRAM 2 LANGUAGE: SPANISH PID 20 | TS PACKET AUDIO DATA OF PROGRAM 1 LANGUAGE: FRENCH PID 16 | TS PACKET AUDIO DATA OF PROGRAM 1 LANGUAGE: JAPANESE PID 17 | TS PACKET AUDIO DATA OF PROGRAM 2 LANGUAGE: JAPANESE PID 21 | TS PACKET NIT PID 10 |

FIG.4

| | TS PACKET CONSTITUTING TS 200 | |
|---|---|---|
| | DATA STORED IN DATA REGION | PID |
| PSI | PAT | 0 |
| | PMT OF PROGRAM 1 | 11 |
| | PMT OF PROGRAM 2 | 12 |
| | NIT | 10 |
| PROGRAM DATA | VIDEO DATA OF PROGRAM 1 | 13 |
| | AUDIO DATA OF PROGRAM 1  LANGUAGE: ENGLISH | 14 |
| | AUDIO DATA OF PROGRAM 1  LANGUAGE: SPANISH | 15 |
| | AUDIO DATA OF PROGRAM 1  LANGUAGE: FRENCH | 16 |
| | AUDIO DATA OF PROGRAM 1  LANGUAGE: JAPANESE | 17 |
| | VIDEO DATA OF PROGRAM 2 | 18 |
| | AUDIO DATA OF PROGRAM 2  LANGUAGE: ENGLISH | 19 |
| | AUDIO DATA OF PROGRAM 2  LANGUAGE: SPANISH | 20 |
| | AUDIO DATA OF PROGRAM 2  LANGUAGE: JAPANESE | 21 |

FIG.5

| PAT | |
|---|---|
| PROGRAM NO. | PID OF PMT |
| PROGRAM 1 | 11 |
| PROGRAM 2 | 12 |

FIG.6A

| PMT OF PROGRAM 1 | |
|---|---|
| STREAM TYPE | ELEMENTARY PID |
| VIDEO DATA OF PROGRAM 1 | 13 |
| AUDIO DATA OF PROGRAM 1  LANGUAGE: ENGLISH | 14 |
| AUDIO DATA OF PROGRAM 1  LANGUAGE: SPANISH | 15 |
| AUDIO DATA OF PROGRAM 1  LANGUAGE: FRENCH | 16 |
| AUDIO DATA OF PROGRAM 1  LANGUAGE: JAPANESE | 17 |

FIG.6B

| PMT OF PROGRAM 2 | |
|---|---|
| STREAM TYPE | ELEMENTARY PID |
| VIDEO DATA OF PROGRAM 2 | 18 |
| AUDIO DATA OF PROGRAM 2  LANGUAGE: ENGLISH | 19 |
| AUDIO DATA OF PROGRAM 2  LANGUAGE: SPANISH | 20 |
| AUDIO DATA OF PROGRAM 2  LANGUAGE: JAPANESE | 21 |

INFORMATION RECORDING APPARATUS AND INFORMATION RECORDING CONTROL APPARATUS

BACKGROUND OF THE INVENTION

1. Field of the Invention

The present invention relates to an information recording apparatus and an information recording control apparatus.

2. Description of Related Art

There is known a conventional information recording apparatus which receives a digital type television broadcast signal ("digital broadcast signal", hereinafter), converts the digital broadcast signal into an analog signal and records the analog signal. In such an information recording apparatus, if digital audio data of a plurality of languages is included in the digital broadcast signal, one of digital audio data of the plurality of languages is converted into the analog audio signal and recorded, but if the one language is not a user-desiring specific language, there is a problem that the analog audio signal of the user-desiring specific language can not be recorded.

As a television broadcast receiver which receives a television broadcast signal including video data and audio data of a plurality of languages, there is a proposed television broadcast receiver capable of outputting audio based on the audio data in the received television broadcast signal in a language selected by a user (see Japanese Translation Publication of PCT International Application No. 2003-504984 for example). In the television broadcast receiver disclosed in Japanese Translation Publication of PCT International Application No. 2003-504984, a program guide can also be shown in a language selected by a user.

In an information recording apparatus (hard disk recorder) which records a television broadcast signal, data for a menu screen of a plurality of languages is previously recorded in the information recording apparatus, so that a recording region is wastefully occupied. Therefore, there is proposed an information recording apparatus in which only data for the menu screen in a specific language set by a user is left, and menu screen data of other languages can be deleted (see Japanese Patent Application Laid-open No. 2002-77791 for example).

As a digital television broadcast receiver which records a digital broadcast signal in an information recording apparatus (hard disk drive), there is proposed a digital television broadcast receiver in which digital video data is thinned out so as to record long-time digital broadcast signals (see Japanese Patent Application Laid-open No. 2003-333532 for example).

In the above patent documents, a method for converting the digital audio data in the digital broadcast signal into the analog audio signal and recording the analog audio signal is not described. Thus, in the information recording apparatus which converts the digital broadcast signal into the analog signal and records the analog signal, a problem that an analog audio signal of a user-desiring specific language can not be recorded can not be solved.

SUMMARY OF THE INVENTION

It is an object of the present invention to provide an information recording apparatus and an information recording control apparatus capable of recording an analog audio signal of a user-desiring specific language.

In order to accomplish the above object, in accordance with a first aspect of the invention, an information recording apparatus which records information comprises: a receiving section to receive a digital broadcast signal; a selection section on which one or two specific language is selected; a video acquiring section to acquire digital video data from the digital broadcast signal received by the receiving section; an audio acquiring section to acquire digital audio data of the one or two specific language selected on the selection section from the digital audio data of a plurality of languages in the digital broadcast signal received by the receiving section; a video converting section to convert the digital video data acquired by the video acquiring section into an analog video signal; an audio converting section to convert, into an analog audio signal of the specific language, digital audio data of the one or two specific language acquired by the audio acquiring section; and a recording control section to record, in a recording section, the analog video signal converted by the video converting section and the analog audio signal of the one or two specific language converted by the audio converting section.

According to the invention, the receiving section can receive the digital broadcast signal, one or two specific language can be selected on the selection section, and the video acquiring section can acquire the digital video data from the digital broadcast signal received by the receiving section. The audio acquiring section can acquire the digital audio data of the one or two specific language selected on the selection section from the digital audio data of the plurality of languages in the digital broadcast signal received by the receiving section. The video converting section can converts the digital video data acquired by the video acquiring section into the analog video signal. The audio converting section can converts the digital audio data of the one or two specific language acquired by the audio acquiring section into the analog audio signal of the specific language. The recording control section can record, in the recording section, the analog video signal converted by the video converting section, and the analog audio signal of the one or two specific language converted by the audio converting section.

Thus, the analog audio signal of the user-desiring specific language selected on the selection section can be recorded.

Since a user can selected two languages as specific languages, the information recording apparatus has excellent usability.

In accordance with a second aspect of the invention, An information recording control apparatus comprises: a selection section on which a specific language is selected; a video acquiring section to acquire digital video data in a digital broadcast signal from the digital broadcast signal; an audio acquiring section to acquire digital audio data of the specific language selected on the selection section from the digital audio data of a plurality of languages in the digital broadcast signal; a video converting section to convert the digital video data acquired by the video acquiring section into an analog video signal; an audio converting section to convert the digital audio data of the specific language acquired by the audio acquiring section into an analog audio signal of the specific language; and an output section to output, to a recording device, the analog video signal converted by the video converting section and the analog audio signal of the specific language converted by the audio converting section.

According to the invention, the specific language can be selected on the selection section, the video acquiring section can acquire the digital video data in the digital broadcast signal from the digital broadcast signal. The audio acquiring section can acquire the digital audio data of the specific language selected on the selection section from the digital audio data of the plurality of languages in the digital broadcast signal. The video converting section can convert the digital video data acquired by the video acquiring section into the analog video signal. The audio converting section can convert the digital audio data of the specific language acquired by the audio acquiring section into the analog audio signal of the specific language. The output section can output, to the recording device, the analog video signal converted by the video converting section, and the analog audio signal of the specific language converted by the audio converting section.

Therefore, the analog audio signal of the user-desiring specific language selected on the selection section can be recorded.

Preferably, the number of specific languages which can be selected on the selection section is two, and the output section outputs, to the recording device, the analog video signal converted by the video converting section and an analog audio signal of the two specific languages converted by the audio converting section.

Moreover, not to mention the same effect as above, the number of the specific languages which can be selected on the selecting section is two, and the output section can output, to the recording device, the analog video signal converted by the video converting section, and the two specific languages of the analog audio signal converted by the audio converting section.

Since a user can selected two languages as specific languages, the information recording apparatus has excellent usability.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein:

FIG. 1 is a block diagram showing a functional configuration of an information recording apparatus of the present invention;

FIG. 2 is a diagram showing a TS data configuration;

FIG. 3 is a diagram showing the TS received by the information recording apparatus of the invention;

FIG. 4 is a diagram showing a data configuration of a TS packet constituting the TS shown in FIG. 3;

FIG. 5 is a diagram showing a PAT data configuration shown in FIG. 4;

FIG. 6A is a diagram showing a PMT data configuration shown in FIG. 4;

FIG. 6B is a diagram showing a PMT data configuration shown in FIG. 4; and

DETAILED DESCRIPTION OF THE PREFERRED EMBODIMENTS

Figure 7:
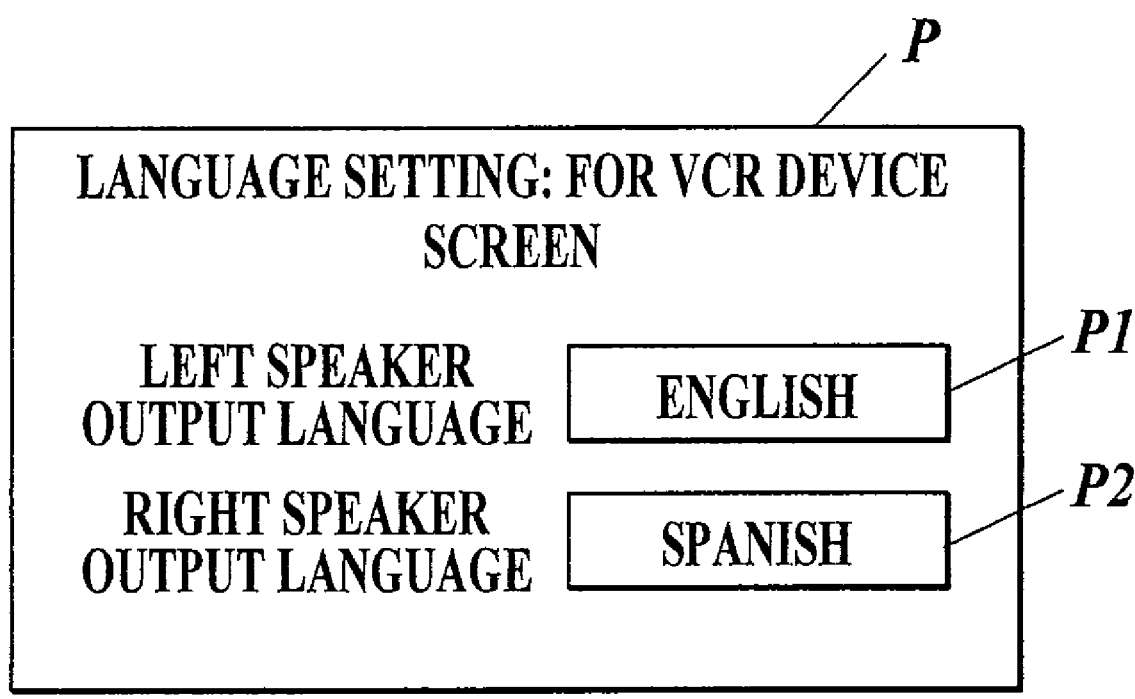
FIG. 7 is a diagram showing a "language setting (for VCR device) screen".

The best modes of an information recording apparatus and an information recording control apparatus according to the present invention will be explained in detail with reference to the drawings. The scope of the invention is not limited to illustrated examples.

<Structure of Information Recording Apparatus>

An information recording apparatus 100 integrally includes a television broadcast receiver 1 as an information recording control apparatus, a VCR (Video Cassette Recorder) device 3 as a recording control section and a recording device for recording information which is output from the television broadcast receiver 1, and an output device 5.

The television broadcast receiver 1 includes a tuner 12 having an antenna 11, a demodulator 13, a HDD 14, a decoder 15, a D/A converter 16, a processing section 17, an OSD circuit 18, an operating section 19 and a control section 20. These constituents are connected to one another through a bus 10.

The television broadcast receiver 1 is connected to a VCR device 3 through the D/A converter 16 and the processing section 17, and is connected to an output device 5 through the processing section 17.

The tuner 12 having the antenna 11 receives a digital broadcast signal existing in a frequency band corresponding to a channel of a user-desiring broadcast program from digital type television broadcast signals (digital broadcast signals) received by the antenna 11 in accordance with a control signal which is input from the control section 20. The tuner 12 modulates the received digital broadcast signal and outputs an intermediate-frequency signal to the demodulator 13.

The demodulator 13 subjects the intermediate-frequency signal which is output from the tuner 12 to processing in accordance with a control signal which is input from the control section 20. More specifically, the demodulator 13 digital-modulates the intermediate-frequency signal and corrects errors of the intermediate-frequency signal. Further, the demodulator 13 outputs stream (e.g., MPEG2 (Moving Picture Experts Group phase 2)—transport stream ("TS", hereinafter)) to the HDD 14 and the decoder 15.

Here, the TS will be explained.

For example, the TS is one string of data formed in such a manner that compressed digital video data, compressed digital audio data and other data in a plurality of programs are subjected to time division, necessary information is added, and the divided data sets are arranged in time sequence in succession and multiplexed.

As shown in FIG. 2 for example, the TS comprises a plurality of TS packets, each TS packet comprises a TS header and a data region.

In the TS header, information such as a synchronous byte indicative of a lead of the TS packet, and a PID (Packet Identifier) for identifying the TS packet is stored.

Program data constituting a program and PSI (Program Specific Information) are stored in the data region. The TS packets are classified into one in which a program data is stored in the data region and one in which the PSI is stored in the data region.

The compressed digital video data, the compressed digital audio data and the other data of the programs are time-divided in the program data.

The PSI is information indicating a relationship between each program and program data constituting each program. The PSI is classified into a PAT (Program Association Table), a PMT (Program Map Table), a NIT (Network Information Table) and a CAT (Conditional Access Table).

The PAT is information for designating, for each program, a PID of a TS packet including the PMT.

The PMT is information for designating a PID of the TS packet including program data.

That is, a PID of a PMT corresponding to a program number is described in the PAT. Compressed digital video data, compressed digital audio data and other data included in corresponding programs are described in the PMT. Therefore, only a TS packet constituting a user-desiring program can be taken out from the TS based on the PAT and the PMT.

The CAT is information for designating PID of a TS packet including decryption information used for descrambling pay channels.

The NIT is physical information concerning a conveying path (e.g., frequency for each transponder).

A more concrete example will be explained based on a TS 200 as shown in FIG. 3 in which two programs are time-divided and multiplexed per one channel.

As shown in FIG. 4 for example, TS packets constituting the TS 200 are classified into one in which a PSI is stored in a data region and one in which program data is stored in a data region. A TS packet is identified by a PID based on PSI stored in the data region and contents of program data.

For example, as shown in FIG. 5, a program number and a PID of a PMT, which are associated with each other, are described in a PAT stored in a data region of a TS packet of the PID "0" shown in FIG. 4. With this, it is possible to identify a PID of a PMT of each program.

More specifically, the PAT in FIG. 5 shows that the PMT of the program number "program 1" is stored in a data region of the TS packet of the PID "11", and the PMT of the program number "program 2" is stored in the data region of the TS packet of the PID "12".

In the PMTs stored in the data regions of the TS packets of the PID "11" and the PID "12" shown in FIG. 4, for example, as shown in FIG. 6, a stream type (type of program data) and an elementary PID (PID of TS packet in which program data is included) are described in an associated manner. With this, it is possible to identify a PID of program data constituting each program.

More specifically, PMT of the program 1 in FIG. 6A is constituted by video data (compressed digital video data) and audio data (compressed digital audio data) of a plurality of languages (four languages, i.e., English, Spanish, French and Japanese), and FIG. 6A shows that the video data is stored in a data region of a TS packet of a PID "13", "English" audio data is stored in a data region of a TS packet of a PID "14", "Spanish" audio data is stored in a data region of a TS packet of a PID "15", "French" audio data is stored in a data region of a TS packet of a PID "16", and "Japanese" audio data is recorded in a data region of a TS packet of a PID "17".

A PMT of a program 2 shown in FIG. 6B is constituted by video data (compressed digital video data) and audio data (compressed digital audio data) of a plurality of languages (three languages, i.e., English, Spanish and Japanese), and FIG. 6B shows that the video data is recorded in a data region of a TS packet of a PID "18", "English" audio data is recorded in a data region of a TS packet of a PID "19", "Spanish" audio data is recorded in a data region of a TS packet of a PID "20", and "Japanese" audio data is recorded in a data region of a TS packet of a PID "21", The HDD 14 comprises a magnetic recording medium, an optical recording medium or a semiconductor memory.

More specifically, the HDD 14 records a digital broadcast signal (TS) which is received by the tuner 12 and output from the demodulator 13 in accordance with a control signal which is input from the control section 20.

The HDD 14 also outputs the recorded TS to the decoder 15 in accordance with a control signal which is input from the control section 20.

A digital broadcast signal (TS) is received by the tuner 12 and output from the demodulator 13, or recorded in the HDD 14 and output from the HDD 14. The decoder 15, for example, acquires digital video data in the digital broadcast signal (TS), and outputs the same to the D/A converter 16 in accordance with a control signal which is input from the control section 20. Further, from the digital broadcast signal (TS) which is received by the tuner 12 and output from the demodulator 13, or which is recorded in the HDD 14 and output from the HDD 14, the decoder 15 acquires digital audio data of one or two specific language selected by operation on the operating section 19 by a user from digital audio data of the plurality of languages in the digital broadcast signal (TS), and the decoder 15 outputs the acquired digital audio data to the D/A converter 16.

More specifically, for example, the decoder 15 deciphers a TS which is output from the demodulator 13 or the HDD 14 in accordance with a control signal which is input from the control section 20, determines a TS packet which constitutes this TS, separates data in the TS packet related to the user-desiring broadcast program into compressed digital video data and one or two specific language of compressed digital audio data, decodes the compressed digital video data and the one or two specific language of the compressed digital audio data, and outputs the digital video data and the digital audio data of the one or two specific language to the D/A converter 16.

The D/A converter 16 converts, for example, into an analog video signal, digital video data which is acquired by the decoder 15 and output from the decoder 15 as a video converting section, converts, into one or two specific language of an analog audio signal, digital audio data of one or two specific language which is acquired by the decoder 15 and output from the decoder 15 as an audio converting section, and outputs the converted analog video signal and the converted analog audio signal of the one or two specific language to the VCR device 3 or the processing section 17.

The VCR device 3, for example, records the analog video signal which is output from the D/A converter 16 and the analog audio signal of the one or two specific language in a video tape 31 as a recording section.

The VCR device 3 outputs, for example, to the processing section 17, the analog video signal and the analog audio signal of the one or two specific language recorded on the video tape 31.

As shown in FIG. 1, the processing section 17 includes an audio processing section 171 and a video processing section 172.

The audio processing section 171, for example, subjects an analog audio signal of one or two specific language which is output from the D/A converter 16 or the VCR device 3 to predetermined audio processing, and outputs the analog audio signal of the one or two specific language to a audio output section 51 of the output device 5 in accordance with a control signal which is input from the control section 20.

The video processing section 172, for example, subjects an analog video signal which is output from the D/A converter 16 or the VCR device 3 to predetermined video processing and outputs the analog video signal to a video display section 52 of the output device 5 in accordance with a control signal which is input from the control section 20.

An OSD display signal makes the video display section 52 of the output device 5 display information on a predetermined on-screen display (OSD). The OSD circuit 18, for example, synthesizes the OSD display signal on an analog video signal which is output from the video processing section 172 to the video display section 52 in accordance with a control signal which is input from the control section 20.

As shown in FIG. 1, for example, the output device 5 includes the audio output section 51, the video display section 52, and so on.

The audio output section 51 is, for example, a speaker or the like, and outputs a audio based on an analog audio signal which is output from the audio processing section 171.

The audio output section 51, for example, includes at least left and right speakers (not shown).

The video display section 52 is, for example, a liquid crystal display, and displays video based on an analog video signal which is output by the video processing section 172, and displays video based on an analog video signal which is output from the video processing section 172 and on which an OSD display signal (described later) is synthesized by the OSD circuit 18.

The operating section 19, for example, includes an operation button (not shown) provided on an outer surface of the information recording apparatus 100 (television broadcast receiver 1), a remote controller (not shown) for the information recording apparatus 100 (television broadcast receiver 1), and a remote controller receiving section (not shown) which can communicate with the remote controller. The operating section 19 is, for example, operated by a user, and outputs various signals generated by the operation to the control section 20.

More specifically, the operating section 19 is, for example, operated when a user selects one or two specific language as a selecting section.

More specifically, for example, if a user operates the operating section 19 and sets a language of an analog audio signal to be recorded on the video tape 31 by the VCR device 3, the control section 20, for example, displays a "language setting (for VCR device) screen" P as shown in FIG. 7 on the video display section 52 through the OSD circuit 18.

The "language setting (for VCR device) screen" P, for example, includes a "left speaker output language selecting column" P1 and a "right speaker output language selecting column" P2.

In the "left speaker output language selecting column" P1, for example, a user can select one specific language by operating the operating section 19, and the one selected specific language of an analog audio signal is recorded on the video tape 31 by the VCR device 3 as an analog audio signal which is output from the left speaker (not shown) of the audio output section 51.

In the "right speaker output language selecting column" P2, for example, the user can select one specific language by operating the operating section 19, and the one selected specific language of an analog audio signal is recorded on the video tape 31 by the VCR device 3 as an analog audio signal which is output from the right speaker (not shown) of the audio output section 51.

In the "left speaker output language selecting column" P1 and the "right speaker output language selecting column" P2, even if two different specific languages are selected, when audio based on the analog audio signal of the selected two specific languages is output from the audio output section 51, it is of course possible to switch between "audio of the selected two specific languages are output from the left and right speakers at the same time" and "audio of only one of the selected two specific languages is output from the left and right speakers".

As shown in FIG. 1, the control section 20 includes a CPU (Central Processing Unit) 201, a RAM (Random Access Memory) 202 and a ROM (Read Only Memory) 203.

The CPU 201 performs various controls in accordance with various processing program for the television broadcast receiver 1 (information recording apparatus 100) recorded in the ROM 203.

The RAM 202 includes a program storage region where a processing program executed by the CPU 201 is expanded, and a data storage region where input data and a processing result generated when the processing program is executed are stored.

The ROM 203 stores therein a system program which can be executed by the television broadcast receiver 1 (information recording apparatus 100), various processing programs which can be executed by the system program, data used when the various processing programs are executed, and data of the processing result which is calculated by the CPU 201. The programs are stored in the ROM 203 in the form of computer readable program codes.

More specifically, as shown in FIG. 1, an acquisition control program 2031 and an output control program 2032 are recorded in the ROM 203.

The acquisition control program 2031, for example, allows the CPU 201 to realize a function to output a control signal to the decoder 15, a function to acquire a digital video data in a digital broadcast signal (TS) from the digital broadcast signal (TS) which is received by the tuner 12 and output from the demodulator 13 or the digital broadcast signal (TS) which is recorded in the HDD 14 and output from the HDD 14 and to output the digital video data to the D/A converter 16, and a function to acquire digital audio data of one or two specific language selected by a user's operation on the operating section 19 from the digital audio data of the plurality of languages in the digital broadcast signal (TS) which is received by the tuner 12 and output from the demodulator 13 or the digital broadcast signal (TS) which is recorded in the HDD 14 and output from the HDD 14, and to output the same to the D/A converter 16.

An acquiring section includes the decoder 15 and the CPU 201 which executes the acquisition control program 2031.

The output control program 2032, for example, allows the CPU 201 to realize a function to output a control signal to the D/A converter 16, and a function to output, to the VCR device 3, an analog video signal which is converted by the D/A converter 16, and one or two specific language of an analog audio signal which is converted by the D/A converter 16.

Here, an output section includes the D/A converter 16 and the CPU 201 which executes the output control program 2032.

<Processing Executed by Information Recording Apparatus>

More specifically, for example, assume that a user instructs to record program data of the "program 2" on the video tape 31 which is set in the VCR device 3 and "English" is selected as the specific language in the "left speaker output language selecting column" P1 in the "language setting (for VCR device) screen" P and "Spanish" is selected as the specific language in the "right speaker output language selecting column" P2 by the user's operation on the operating section 19. The CPU 201 first executes the acquisition control program 2031, outputs a control signal to the decoder 15, allows the decoder 15 to decipher the digital broadcast signal (TS 200 (FIG. 2)) which is received by the tuner 12 and output from the demodulator 13 or the digital broadcast signal (TS 200) which is recorded in the HDD 14 and output from the HDD 14, and allows the decoder 15 to discriminate each TS packet based on the PAT and PMT stored in the data region of the TS packet.

Then, the CPU 201 allows the decoder 15 to separate compressed digital video data of the "program 2" from a TS packet of the PID "18" (TS packet in which video data of the "program 2" is stored in its data region) and acquire the compressed digital video data, to separate "English" compressed digital audio data of the "program 2" from a TS packet of the PID "19" (TS packet in which audio data (language is English) of the "program 2" is stored in its data region) and acquire the "English" compressed digital audio data, and to separate "Spanish" compressed digital audio data of the "program 2" from a TS packet of the PID "20" (TS packet in which audio data (language is Spanish) of the "program 2" is stored in its data region) and acquire the "Spanish" compressed digital audio data.

Then, the CPU 201 allows the decoder 15 to decode the acquired compressed digital video data of the "program 2", the "English" compressed digital audio data of the "program 2", and the "Spanish" compressed digital audio data of the "program 2". The CPU 201 allows the D/A converter 16 to output digital video data of the "program 2", "English" digital audio data of the "program 2" and "Spanish" digital audio data of the "program 2".

Then, the CPU 201 outputs a control signal to the D/A converter 16, and allows the D/A converter 16 to convert the digital video data of the "program 2" into an analog video signal of the "program 2", to convert the "English" digital audio data of the "program 2" into "English" analog audio signal of the "program 2", and to convert the "Spanish" digital audio data of the "program 2" into "Spanish" analog video signal of the "program 2".

Then, the CPU 201 executes the output control program 2032, outputs a control signal to the D/A converter 16, and allows the D/A converter 16 to output, to the VCR device 3, the converted analog video signal of the "program 2", the converted "English" analog audio signal of the "program 2", and the converted "Spanish" analog audio signal of the "program 2". At that time, the CPU 201 allows the D/A converter 16 to output the "English" analog audio signal of the "program 2" as the analog audio signal to be output from the left speaker (not shown) of the video display section 52, and to output the "Spanish" analog audio signal of the "program 2" as the analog audio signal to be output from the right speaker (not shown) of the video display section 52.

Next, the VCR device 3 records, on the set video tape 31, the analog video signal of the "program 2", the "English" analog audio signal of the "program 2", and the "Spanish" analog audio signal of the "program 2", all of which are output from the decoder 15. At that time, the VCR device 3 records the "English" analog audio signal of the "program 2" as an analog audio signal to be output from the left speaker (not shown) of the video display section 52, and records the "Spanish" analog audio signal of the "program 2" as an analog audio signal to be output from the right speaker (not shown) of the video display section 52.

The above-explained information recording apparatus 100 of the present invention includes the television broadcast receiver 1, the VCR device 3 to record information which is output from the television broadcast receiver 1, and the output device 5. According to the television broadcast receiver 1, the tuner 12 can receive a digital broadcast signal, the HDD 14 can record the digital broadcast signal (TS) received by the tuner 12, one or two specific language can be selected by a user's operation on the operating section 19, and decoder 15 and the CPU 201 which executes the acquisition control program 2031 can acquire digital video data from a digital broadcast signal (TS) which is received by the tuner 12 and output from the demodulator 13 or from a digital broadcast signal (TS) which is recorded in the HDD 14 and output from the HDD 14, and can acquire digital audio data of one or two specific language selected by the user's operation on the operating section 19 from digital audio data of the plurality of languages. The D/A converter 16 can convert, into an analog video signal, a digital video data acquired by the decoder 15 and the CPU 201 which executes the acquisition control program 2031, and can convert, into an analog audio signal of one or two specific language, digital audio data of one or two specific language acquired by the decoder 15 and the CPU 201 which executes the acquisition control program 2031. The D/A converter 16 and the CPU 201 which executes the output control program 2032 can output, to the VCR device 3, an analog video signal which is converted by the D/A converter 16 and an analog audio signal of one or two specific language. The VCR device 3 can record, on the video tape 31, an analog video signal which is output from the D/A converter 16 and the CPU 201 which executes the output control program 2032, and an analog audio signal of one or two specific language.

Therefore, the analog audio signal of the user-desiring specific language selected by the user's operation on the operating section 19 can be recorded.

Since a user can select two languages as specific languages, the information recording apparatus has excellent usability.

Incidentally, the present invention is not limited to the aforesaid embodiment, and can appropriately be modified within a range of not departing from the spirit of the invention.

The compressed digital audio data (languages of "English", "Spanish" and the like) is described in the PMT, but it may be described in a Service Location Descriptor of a PSIP for example.

The digital broadcast signal which is received by the tuner 12 and output from the demodulator 13, and the digital broadcast signal which is recorded in the HDD 14 may be program streams (PS) and the like for example.

The number of specific languages selected by a user's operation on the operating section 19 may be one instead of two.

The television broadcast receiver 1 constituting the information recording apparatus 100, the VCR device 3 and the output device 5 may be independent elements. In this case, the television broadcast receiver 1 is a STB (Set Top Box) for example. It is necessary that the television broadcast receiver 1 includes a first audio output terminal which outputs an analog audio signal of one of the two specific languages selected by a user's operation on the operating section 19, and a second audio output terminal which outputs an analog audio signal of the other specific language, and that the VCR device 3 includes a first audio input terminal to which the analog audio signal of the one specific language which is output from the first audio output terminal, and a second audio input terminal to which the analog audio signal of the other specific language which is output from the second audio output terminal.

The recording apparatus is not limited to the VCR device 3, and a DVD recorder and the like may be used only if an input analog audio signal can be recorded in a predetermined recording medium as a recording section.

The entire disclosure of Japanese Patent Application No. 2006-113466 filed on Apr. 17, 2006, including description, claims, drawings and summary are incorporated herein by reference in its entirety.

What is claimed is:

1. An information recording apparatus which records information comprising:
   a receiving section to receive a digital broadcast signal;
   a selection section on which one or two specific languages are selected with regard to each desired program, and on which a speaker to output an audio of the selected one specific language is selected or speakers to output audios of the selected two specific languages are respectively selected;
   a video acquiring section to acquire digital video data from the digital broadcast signal received by the receiving section;

an audio acquiring section to acquire digital audio data of the one or two specific languages selected on the selection section from the digital audio data of a plurality of languages in the digital broadcast signal received by the receiving section;

a video converting section to convert the digital video data acquired by the video acquiring section into an analog video signal;

an audio converting section to convert, into an analog audio signal of the specific language, digital audio data of the one or two specific languages acquired by the audio acquiring section; and a recording control section to record, in a recording section, the analog video signal converted by the video converting section and the analog audio signal of the one or two specific languages converted by the audio converting section.

2. An information recording control apparatus comprising:

a selection section on which a specific language is selected with regard to each desired program, and on which a speaker to output an audio of the selected specific language is selected;

a video acquiring section to acquire digital video data in a digital broadcast signal from the digital broadcast signal;

an audio acquiring section to acquire digital audio data of the specific language selected on the selection section from the digital audio data of a plurality of languages in the digital broadcast signal;

a video converting section to convert the digital video data acquired by the video acquiring section into an analog video signal;

an audio converting section to convert the digital audio data of the specific language acquired by the audio acquiring section into an analog audio signal of the specific language; and an output section to output, to a recording device, the analog video signal converted by the video converting section and the analog audio signal of the specific language converted by the audio converting section.

3. The information recording control apparatus of claim 2, wherein the number of specific languages which can be selected on the selection section is two, and the output section outputs, to the recording device, the analog video signal converted by the video converting section and an analog audio signal of the two specific languages converted by the audio converting section.

* * * * *